(12) United States Patent
Durris et al.

(10) Patent No.: US 7,267,050 B2
(45) Date of Patent: Sep. 11, 2007

(54) JUICER HAVING AN ARTICULATED ARM CARRYING A PRESSING ELEMENT

(75) Inventors: Cyril Durris, Montignac (FR); Laurent David, Tarbes (FR); Marc Suberbie, Tarbes (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 11/373,124

(22) Filed: Mar. 13, 2006

(65) Prior Publication Data

US 2006/0207445 A1   Sep. 21, 2006

(30) Foreign Application Priority Data

Mar. 17, 2005   (FR) .................................. 05 02638

(51) Int. Cl.
*B30B 9/08* (2006.01)
*A23N 1/00* (2006.01)

(52) U.S. Cl. ...................... 100/213; 100/234; 100/292; 99/507

(58) Field of Classification Search ................ 100/110, 100/125, 131, 132, 133, 134, 135, 213, 234, 100/283, 292, 293; 99/495, 506–508; D7/665, D7/666; 285/396, 402; 403/348, 349, 353
See application file for complete search history.

(56) References Cited

U.S. PATENT DOCUMENTS

| 28,967 | A | * | 7/1860 | Chichester | 100/213 |
| 2,724,326 | A | * | 11/1955 | Long | 100/98 R |
| 5,463,941 | A | * | 11/1995 | Gibson | 99/495 |
| 5,915,482 | A | * | 6/1999 | Carruthers | 172/375 |
| 6,155,164 | A | * | 12/2000 | Egana et al. | 100/125 |
| 2004/0074403 | A1 | * | 4/2004 | Canizares et al. | 100/234 |

FOREIGN PATENT DOCUMENTS

FR   2 649 878 A   1/1991
WO   WO 2005/041732 A1   5/2005

* cited by examiner

*Primary Examiner*—Jimmy Nguyen
(74) *Attorney, Agent, or Firm*—Browdy and Neimark, PLLC

(57) ABSTRACT

A juicer composed of: a housing provided to receive a rotatable element for extraction of juice; an arm that is mounted to the housing to pivot about an axis with respect to the housing; a pressing element for pressing a fruit half against the rotatable element; and a pivot element mounting the pressing element to the arm to pivot about a pivot axis with respect to the arm.

14 Claims, 2 Drawing Sheets

JUICER HAVING AN ARTICULATED ARM CARRYING A PRESSING ELEMENT

BACKGROUND OF THE INVENTION

The present invention concerns the technical field of juicers and relates particularly to juicers having an articulated arm, a rotatable cone and an element arranged to bear on the upper part of a citrus fruit half placed on the rotatable cone.

The French patent documents FR 1164016 and 2649878 disclose juicers provided with an electric motor driving a rotatable cone and provided with an articulated upper arm to which is rigidly fixed, at a constant angle with respect to the arm, a pressing element in the approximate form of a cone intended to maintain the fruit half on the rotatable cone.

However, such juicers present the drawback of having a pressing element that causes the fruit half to pivot during lowering of the arm, the pressing element being fixed with respect to the pivotally mounted arm and presenting, as a result, during the lowering of the arm, an axis different from that of the fruit half. The fruit half, displaced from its initial position, is not pressed throughout its entire volume so that the yield of juice is reduced.

BRIEF SUMMARY OF THE INVENTION

The present invention overcomes these drawbacks and provides a juicer having a pivotally mounted arm that prevents rocking of the fruit half during lowering of the arm in a manner to increase the yield of juice.

The invention also easily provides a juicer that is simple, economical and easy to use.

A juicer according to the present invention comprises a housing provided to receive a rotatable element for extraction of juice, an arm that is pivotally mounted to the housing, and a pressing element for pressing a fruit half against the rotatable element, wherein the pressing element is pivotally mounted with respect to the arm by a connector member.

Such a juicer presents a pressing element whose angle of attack is adapted to the position and size of the fruit half, starting from its contact with the fruit half, during lowering of the arm. Thus, the fruit half is not displaced by the pressing element relative to the axis of the rotatable juice extraction element and extraction of juice can be carried out over the entire interior volume of the fruit half without requiring that the fruit half be manually held.

Advantageously, the pivot axis of the pressing element with respect to the arm is parallel to the pivot axis of the arm with respect to the housing.

In effect, in a conventional juicer having a pressing element that is rigidly fixed to the arm, the pressing element has only one degree of freedom with respect to the housing, corresponding to the pivotal movement of the arm with respect to the housing. In order to prevent rocking, or tilting, of the fruit half, the pressing element according to the invention is mounted to be pivotable parallel to the pivot axis of the arm in order to not provoke a rocking of the fruit half.

Preferably, the pressing element is movably mounted against a return means.

Then, after its displacement, the pressing element is returned to its initial position in a manner to not displace, during lifting of the arm, the pressed fruit half, and in a manner such that the juicer is ready for a renewed lowering of the arm.

Advantageously, the return means exerts a return force that pivots the pressing element toward the pivot axis of the arm with respect to the housing. In effect, pivoting of the pressing element relative to the arm during lowering of the arm occurs in the sense opposite to the pivoting of the arm relative to the housing, in a manner to adapt the angle of attack of the pressing element to the position and size of the fruit half.

Advantageously, the pressing element is mounted to be removable from the arm. According to one embodiment, the arm has two pivot elements adapted to be inserted into two L-shaped notches formed on a head of the pressing element.

Thus, the pressing element is mounted to be pivotable with respect to the arm around the two pivot elements, employing an assembly of parts that are simple to fabricate and assemble. In addition, due to this assembly in the form of a bayonet attachment, the pressing element can be easily removed.

Advantageously, the head of the pressing element is tubular.

The tubular form of the pressing element at the level of the part coupling it to the arm facilitates removal of the pressing element by rotation.

Advantageously, the two pivot elements of the arm are formed by a single axle.

In effect, the two pivot elements can be formed as a single piece to facilitate their fabrication and assembly of the various parts.

According to another characteristic of the juicers, the rotatable juice extraction element forms a pressing cone having a lateral wall presenting raised projections and a peak presenting a pin.

The form of the rotatable juice extraction element permits it to be adapted to form of the fruit half and to extract the greatest amount of juice possible. The projections of the lateral wall of the pressing cone permit a deeper penetration of the rotatable juice extraction element and an optimal digging into the pulp of the fruit. The pin permits a better holding of the fruit half; which is skewered, or impaled, thereon.

Advantageously, the pressing element has an opening provided to receive the pin of the rotatable juice extraction element.

Thus, when the arm is completely lowered, the pin engages in the opening, which permits guidance of the pressing element above the rotatable juice extraction element to be optimized.

In addition, it permits the pressing element to cap the rotatable cone with a smaller space therebetween, which can be particularly useful in the case of fruit having a thin skin.

According to another characteristic of juicers according to the invention, the pressing element has the form of a bell.

The bell form is adapted to the form of a fruit half in a manner to optimize the pressure exerted on the fruit half against the rotatable juice extraction element.

Advantageously, at least one cutout is provided at the level of the wall of the pressing element.

During lowering of the arm, one or several cutouts facilitate the engagement of the fruit half at the level of the pressing element, regardless of the size of the fruit half.

Advantageously, at least one cutout is located at the side that faces the pivot axis of the arm relative to the housing.

During lowering of the arm, this cutout allows the pressing element to approach the fruit half more closely, regardless of the size of the fruit half.

Advantageously, the pressing element presents tongues.

In comparison with a smooth wall, the tongues provide increased elasticity and thus a better adaptation of the pressing element depending on its position and the size of the fruit half, while sufficiently retaining the fruit half.

Advantageously, ribs are arranged on the internal wall of the pressing element.

These ribs permit a better attachment of the fruit half on the pressing element, thus preventing it from sliding with respect to the internal wall of the pressing element and from turning with the rotatable juice extraction element.

Advantageously, peaks are arranged on the internal wall of the pressing element.

These peaks sink into the skin of the fruit half in order to optimize holding of the fruit half by the pressing element and to prevent the fruit half from starting to rotate.

BRIEF DESCRIPTION OF THE DRAWINGS

The present invention will be described in greater detail with respect to a particular embodiment of the invention presented by way of non-limiting example and shown in the following drawing figures.

DETAILED DESCRIPTION OF THE INVENTION

Figure 1:
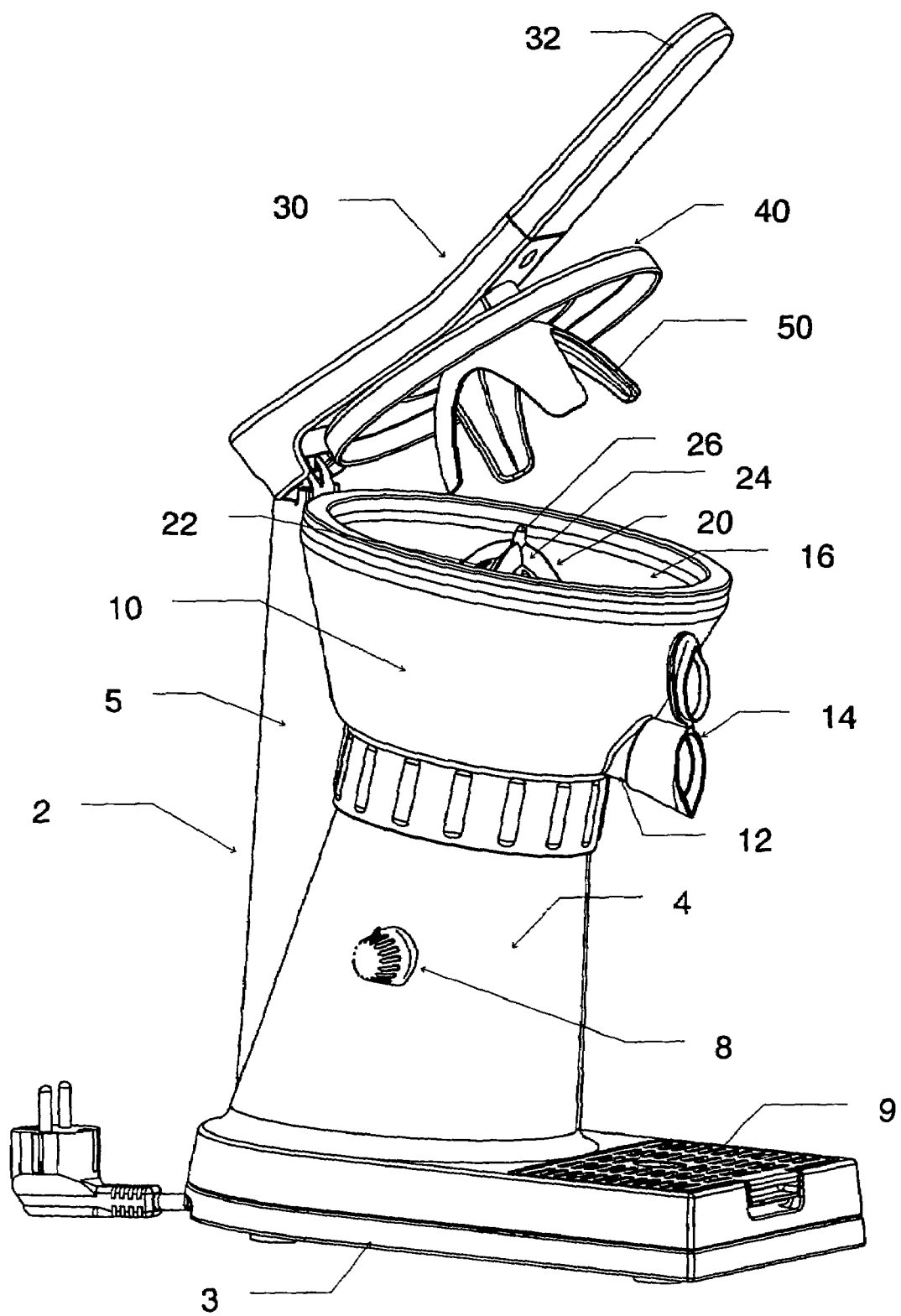
FIG. 1 is a perspective view of a juicer according to the invention, with its arm in a raised position.

Only those elements necessary for an understanding of the invention have been shown. To facilitate an understanding of the drawings, the same reference numeral is employed to identify the same element in various figures.

FIG. 1 shows a juicer that includes a housing 2 that contains a conventional electric motor (not visible) and supports a citrus fruit half receptacle 10 in which there are disposed a filter 16 and a rotatable juice extraction element 20.

Housing 2 is surmounted by an arm 30 that is pivotally mounted to housing 2. Arm 30 carries a lid 40 provided to close juice receptacle 10, and a pressing element 50 adapted to maintain, and bear against, a fruit half previously placed upon a rotatable element 20.

Housing 2 includes a base 3, a body 4 and an upright 5. Base 3 is arranged to be in contact, through the intermediary of feet, with a work surface on which the juicer is placed.

Upright 5, which is a vertical element extending upwardly from base 3, carries arm 30 at its upper end.

Body 4, which also extends upwardly from base 3, has the form of a vertical cylinder that widens slightly toward the bottom and that carries on its outer wall a rotatable control knob 8. Body 4 is arranged on base 3, between upright 5 and a pedestal 9 that is provided to support a container for receiving the juice. This container is not part of the juicer according to the invention and is not illustrated.

At its upper edge, body 4 of housing 2 is surmounted by receptacle 10 which is mounted to be removable from body 4 by being subjected to a quarter turn.

Receptacle 10 has a pouring spout 12 in cylindrical form that is oriented slightly in the direction of pedestal 9 of the base 3, spout 12 being furnished with a closeable nozzle 14.

Receptacle 10 receives, in its interior cavity, a filter 16. Receptacle 10 and filter 16 allow passage of a drive shaft coupled to the electric motor on which rotatable juice extraction element 20 is placed.

Rotatable juice extraction element 20 is intended to receive a half of a fruit, such as an orange, lemon or grapefruit. Element 20 forms a pressing cone 22 having a lateral wall presenting projections 24 formed of four vertical, equidistantly spaced first bulges, or ribs, extending downwardly from the peak of cone 22 and covering a part of the height of cone 22, and of four less prominent vertical bulges interposed between the first four bulges. The totality of these vertical bulges is intended to sink deeply into, and hollow out, the fruit half in a manner to extract therefrom a maximum of juice.

Rotatable juice extraction element 20 has a peak provided with a pin 26 that will penetrate into the fruit half and pass through all or a part of its skin, or rind.

As shown in FIG. 1, rotatable juice extraction element 20 presents an axis of rotation that extends in the direction of pressing element 50.

Arm 30 is pivoted in a manner that is preferably non-removable on upright 5 of housing 2.

Arm 30 is covered at its end remote from upright 5, with a tube 32 corresponding to the part of the arm that will be gripped by the user's hand. Tube 32 can be of a material that is less rigid, or softer, than the remainder of the arm, such as polypropylene plastic PP.

Figure 2:
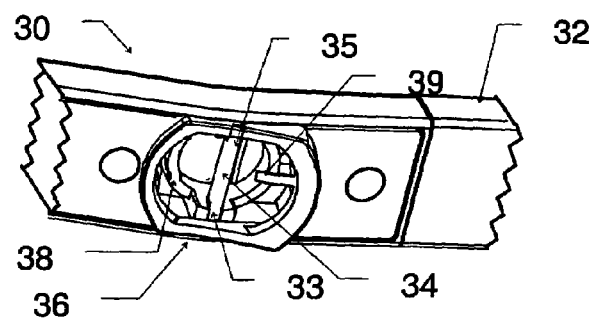
FIG. 2 is a perspective detail view of a portion of the arm, seen from below.

Referring to FIG. 2, arm 30 is provided, in the region not covered by tube 32, at its side facing the opening of juice receptacle 10, with a zone 36 for mounting a lid 40 and pressing element 50.

Arm 30 is provided, in zone 36, with two pivot elements 33 and 35 constituted by respective portions of an axle 34 to which pressing element 50 is pivotally mounted. Axle 34 forms the pivot axis for pressing element 50 and is parallel to the pivot axis of arm 30 relative to housing 5 in a manner such that pressing element 50 can pivot in a median vertical plane of arm 30.

Arm 30 is also provided, in zone 36, with a return, or biasing, means 39 in the form of a leaf spring. The leaf spring is oriented to be perpendicular to axle 34 and is placed to the side of axle 34 that is closer to tube 32. Thus, pressing element 50 is mounted for pivotal movement relative to arm 30 against the restoring force of spring 39. Spring 39 exerts a restoring force that tends to pivot pressing element 50 toward the pivot axis of arm 30 relative to housing 2.

Arm 30 is also provided, in zone 36, with a zone 38 for mounting of lid 40. Advantageously, lid 40 is made of a transparent plastic material. Pressing element 50 is connected to arm 30 through an opening provided in lid 40. Lid 40 has two elastic tongues on its upper face. Each of the tongues has an outwardly extending hook, or latch, element and the hook elements are located and configured to enter into respective openings provided in area 38 and visible in FIG. 2. Thus, lid 40 is rigidly and removably fixed to arm 30. Lid 40 is not pivotably mounted on the arm 30.

Figure 3:
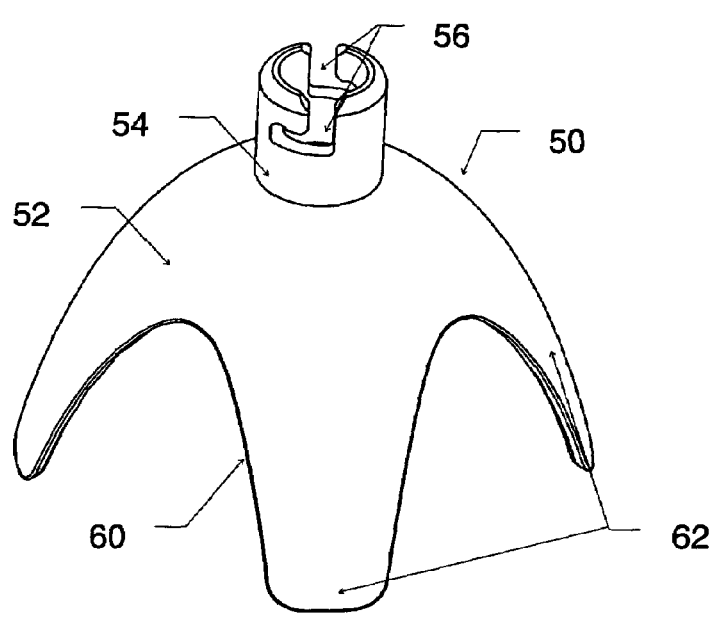
FIG. 3 is a perspective view of the pressing element.
Figure 4:
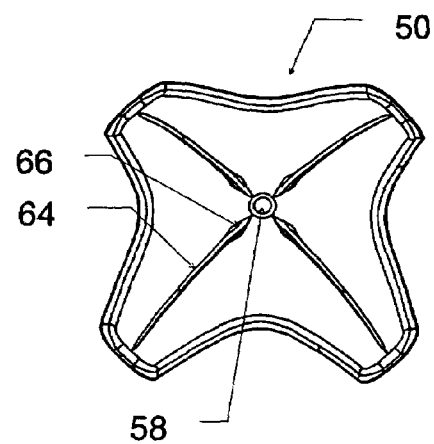
FIG. 4 is a bottom view of the pressing element.

Referring to FIGS. 3 and 4, pressing element 50 has the form of a bell 52 surmounted by a tubular head 54 that will be inserted into zone 36 of arm 30. Two diametrically opposed, L-shaped notches 56 are formed in head 54 and are arranged so that the two pivot elements 33, 35 formed by axle 34 can be inserted into notches 56 and locked in place by rotation of pressing element 50 about a central axis of head 54. Thus, pressing element 50 is secured to arm 30 in a manner to be able to undergo pivotal movement about pivot elements 33 and 35, and thus about the axis of axle 34.

Pressing element 50 is removable from arm 30 by rotating element 50 about the axis of head 54 from the locking position. Thus, notches 56 and axle 34 form a type of bayonet connection.

The pressing element 50 has cutouts 60 that extend upwardly form the lower edge of bell 52 and that form tongues 62 that extend to the lower edge of bell 52. Advantageously, four cutouts 60 and four tongues 62 are provided and are spaced apart equidistantly about the circumference of bell 52.

One of the cutouts 60 faces the pivot axis of arm 30 relative to upright 5 and facilitates closer engagement of pressing element 50 against the fruit half.

In comparison with a solid wall, tongues 62 permit an increase in elasticity that improves adaptation of pressing element 50 depending on its position and the size of the fruit half, while sufficiently gripping the fruit half. In addition, in order to increase the elasticity of tongues 62, pressing element 50 is advantageously made of polypropylene plastic PP, which is more flexible, or supple, than ABS, for example.

On the internal wall of bell 52, pressing element 50 is provided with four vertical ribs 64, shown in FIG. 4. Each rib 64 has a peak 66 close to the upper end of bell 52. Peaks 66 are constructed to sink into the skin of a fruit half in order to optimize retention of the fruit half in a stationary position relative to pressing element 50. Peaks 66 are located at a distance from the lower ends of tongues 62 in order to not act to rigidify the tongues. At the top of the internal wall of bell 52, pressing element 50 is provided with an opening located and dimensioned to receive pin 26 of rotatable juice extraction element 60 when arm 30 has been lowered.

The juicer according to the present invention is operated in the following manner.

The electric motor is started in response to downward displacement of juice extraction element 20 resulting from the lowering of arm 30. Mechanisms for controlling the operation of a motor in response to the downward movement of pressing element 20 are known in the art and their implementation in the juicer of the present invention would be readily apparent to those skilled in the art.

A juice extraction operation is started by placing a fruit half upon juice extraction element 20 after the power cord for the juicer has been connected to a wall outlet. Then, arm 30 is lowered in order to produce, through the intermediary of the fruit half, downward movement of juice extraction element 20, which causes the electric motor and element 20 to begin rotating.

During lowering of arm 30, pressing element 50 comes into contact with the fruit half and due to the pivotal mounting of pressing element 50 with respect to arm 30, the angle of attack of pressing element 50 is adapted to the position and the size of the fruit half in a manner to surround the fruit half and prevent it from rotating or from tilting about a horizontal axis. Thus, juice is extracted from the entire interior region of the fruit half, resulting in a high juice yield.

At the completion of juice extraction, the user raises arm 30 to return pressing element 50 to its initial position with respect to arm 30 due to the action of restoring spring 39. This allows juice extraction element 30 to rise so that the motor is turned off. The fruit half can be removed and the juicer is then ready to press another fruit half or to be cleaned by removing pressing element 50 from arm 30. A suitable juicer mechanism in which the juicer cone is axially movable and in which the motor is turned on by moving the juicer cone downwardly and turned off by moving the juicer cone upwardly is disclosed in U.S. Pat. No. 4,080,885, the disclosure of which is incorporated herein by reference.

According to one alternative form of construction, operation of the electric motor could be controlled by a switch that is coupled to arm 30 to actuate the electric motor when arm 30 is lowered. For example, the switch could be coupled to the motor by a transmission element that is housed in upright 5 and emerges at the top of upright 5.

According to one possible variation, it would be possible to construct the juicer to enable juice extraction element 20 to be caused to rotate by means of a manual switch that is independent of the position of the arm.

According to another possible variation, other types of pivotal connection of the pressing element relative to the arm can be envisioned to produce the type of pivoting movement described above. For example, a pivot element, such as an axle, can be placed on the pressing element and the notches for engaging the pivot element can be mounted on the arm.

According to another possible variation, the pressing element can be coupled to the arm by a pivot arrangement in the form of a ball-and-socket joint.

According to yet another possible variation, the rotatable juice extraction element could be mounted on a body of an appliance that is independent of the base and the upright of the housing on which the arm carrying the pressing element is pivotally mounted.

It is equally possible to imagine provision of an abutment that limits the pivotal movement of the pressing element with respect to the arm.

Since the pressing element is removable, then, according to another possible variation, there can be provided a set of pressing elements having different sizes. For example, different pressing elements could have sizes adapted to mate with oranges, lemons and grapefruit.

It is further possible, according to the invention, to provide a juicer that does not include a lid.

This application relates to subject matter disclosed in French Application number FR 05 02638, filed on Mar. 17, 2005, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A juicer comprising:
    a housing provided to receive a rotatable juice extraction element for extraction of juice;
    an arm that is mounted to said housing to pivot about an axis with respect to said housing;
    a pressing element for pressing a fruit half against said rotatable juice extraction element;
    a connector member mounting said pressing element to said arm to pivot said pressing element about a pivot axis with respect to said arm;
    means for rotating the rotatable juice extraction element about an axis that is transverse to the pivot axis with respect to said arm; and return means provide in said arm to engage said pressing element for urging said pressing element into a rest position, said return means exerting a return force in a direction to pivot said pressing element toward the pivot axis of said arm with respect to said housing, wherein the pivot axis of said pressing element with respect to said arm is parallel to the pivot axis of said arm with respect to said housing.

2. The juicer of claim 1, wherein said connector member comprises: a first unit providing two pivot elements; and a second unit comprising a head provided with two L-shaped notches receiving said two pivot elements, wherein one of said units is fixed to said arm and the other of said units is fixed to said pressing element.

3. The juicer of claim 2, wherein said first unit is fixed to said arm and said second unit is fixed to said pressing element.

4. The juicer of claim 2, wherein said head is tubular.

5. The juicer of claim 2, wherein said two pivot elements are constituted by respective parts of an axle.

6. The juicer of claim 1, further comprising the rotatable juice extraction element, and wherein said rotatable juice extraction element has the form of a pressing cone having a lateral wall presenting raised projections and a peak presenting a pin.

7. The juicer of claim 6, wherein said pressing element has an opening located to receive said pin of said rotatable juice extraction element.

8. The juicer of claim 6, wherein said pressing element has the form of a bell.

9. The juicer of claim 6, wherein the axis that is transverse to the pivot axis with respect to said arm extends toward said pressing element.

10. The juicer of claim 1, wherein said pressing element is constituted by a wall provided with at least one cutout.

11. The juicer of claim 10, wherein said cutout is located to face the pivot axis of said arm with respect to said housing.

12. The juicer of claim 1, wherein said pressing element is constituted by a wall formed to have a plurality of tongues.

13. The juicer of claim 1, wherein said pressing element is constituted by a wall having an interior surface provided with a plurality of ribs.

14. The juicer of claim 1, wherein said pressing element is constituted by a wall having an interior surface provided with a plurality protuberances.

* * * * *